United States Patent
De et al.

(10) Patent No.: US 10,159,951 B2
(45) Date of Patent: Dec. 25, 2018

(54) FCC FEED INJECTOR WITH IMPROVED ATOMIZATION

(71) Applicant: Indian Oil Corporation Limited, Bandra (East), Mumbai (IN)

(72) Inventors: Bidyut De, Faridabad (IN); Shoeb Hussain Khan, Faridabad (IN); Satheesh Vetterkunnel Kumaran, Faridabad (IN); Debasis Bhattacharyya, Faridabad (IN); Brijesh Kumar, Faridabad (IN)

(73) Assignee: INDIAN OIL CORPORATION LIMITED, Bandra (East) (IN)

( * ) Notice: Subject to any disclaimer, the term of this patent is extended or adjusted under 35 U.S.C. 154(b) by 294 days.

(21) Appl. No.: 15/171,661

(22) Filed: Jun. 2, 2016

(65) Prior Publication Data

US 2016/0354748 A1    Dec. 8, 2016

(30) Foreign Application Priority Data

Jun. 3, 2015   (IN) .......................... 2143/MUM/2015

(51) Int. Cl.
  *B05B 7/04*     (2006.01)
  *B05B 7/00*     (2006.01)
  (Continued)

(52) U.S. Cl.
  CPC .............. *B01J 8/24* (2013.01); *B01J 8/1827* (2013.01); *C10G 11/18* (2013.01); *B05B 7/0433* (2013.01); *B05B 7/0483* (2013.01)

(58) Field of Classification Search
  CPC ..... B05B 7/0433; B05B 7/066; B05B 7/0483; B05B 7/0466; B05B 7/2435
  (Continued)

(56) References Cited

U.S. PATENT DOCUMENTS 4,101,073 A * 7/1978 Curran .................... F04F 5/462
                                                      239/14.2
6,669,104 B2   12/2003 Koveal et al.
(Continued)

FOREIGN PATENT DOCUMENTS

CN    201372270        12/2009
CN    202290379 U      7/2012

*Primary Examiner* — Jason J Boeckmann
(74) *Attorney, Agent, or Firm* — Workman Nydegger (57) ABSTRACT

The present invention discloses a method and an apparatus for mixing and atomizing a hydrocarbon stream using a diluent/dispersion stream. In one embodiment, the apparatus comprises: an inner conduit and an outer conduit concentric to each other to define an annular space, said outer conduit having an inlet for receiving the hydrocarbon stream and an outlet for dispensing a mixture comprising the hydrocarbon and the dispersion/diluent streams; a diluent/dispersion steam distributor being in connection with the inner conduit and defining a central orifice and a first set of orifices, said first set of orifices adapted to direct a first portion of the dispersion/diluent stream into the annular space and said central orifice adapted to direct a second portion of the diluent/dispersion stream into the inner conduit; at least one contraction member and expansion member, said contraction member located downstream of the first set of orifices and said expansion member located downstream said expansion member; the inner conduit located downstream of said expansion member comprises a second set of orifices, said second set of orifices disposed on a periphery of the inner conduit and adapted to dispense a second portion of the dispersion/diluent stream into the annular space.

10 Claims, 7 Drawing Sheets

(51) Int. Cl.
*B01J 8/24* (2006.01)
*B01J 8/18* (2006.01)
*C10G 11/18* (2006.01)

(58) Field of Classification Search
USPC .......... 239/416.5, 398, 429–431, 433, 416.4
See application file for complete search history.

(56) References Cited

U.S. PATENT DOCUMENTS 6,902,707 B2    6/2005  Adamson et al.
2012/0302805 A1*  11/2012  De ....................... B01F 5/0256
                                                        585/2

* cited by examiner

FCC FEED INJECTOR WITH IMPROVED ATOMIZATION

TECHNICAL FIELD

The present invention relates to an apparatus and method for mixing and atomizing a hydrocarbon stream using a diluent/dispersion stream.

BACKGROUND

Fluid catalytic cracking (FCC) is employed in petroleum refineries to convert high boiling hydrocarbon fractions of crude oil to more valuable products like Liquefied Petroleum Gas (LPG), gasoline and diesel. For this, heavy crude oil is chemically cracked into lighter hydrocarbon fractions having comparatively smaller chain of carbon atoms with the help of one or more catalysts. These high boiling hydrocarbons fractions are then introduced, in multiple streams, into a riser reactor section to undergo catalytic cracking. This results in lighter hydrocarbon fractions, which may be further sent to a fractional distillation column for extracting aforementioned valuable products.

In Fluid Catalytic Cracking (FCC), the atomization of hydrocarbon feed is very critical for contacting the hydrocarbon feed with catalyst particles. A uniform and narrow distribution of droplet size helps in faster vaporization of hydrocarbon feed leading to reduction in coke and better product selectivity.

In FCC, catalyst particles having particle size distribution in the range of 0-150 μm with average particle size of 70-90 μm are used to carry out the cracking reaction of hydrocarbon feed. Naphtha, which is a light hydrocarbon feed, normally has a boiling point upto 180 degree celsius. Heavy hydrocarbons such as vacuum residue normally boils over 370 degrees Celsius.

The hydrocarbon feed is injected into the moving catalyst particles (said catalyst particles having temperature greater than 650 degree Celsius) from an apparatus for cracking in the form of droplets and the cracking of these feed molecules takes place in vapour phase on the active catalyst surface in a very short period of time. If the feed is injected without proper atomization, the contact of the feed droplets and catalyst particles will be poor and the heat transfer from the hot catalyst particle to feed will be less, resulting in low vaporisation of feed. Therefore, the hydrocarbon feed is required to be atomized into fine droplets which are of similar sizes of catalyst particles. This essentially helps to increase the contact of feed with the catalyst particles and the transfer of heat from the catalyst to feed for faster vaporization.

Uniform feed atomization will favour catalytic cracking, resulting in more desirable products and decrease in production of undesirable product (coke and dry gas). While designing an apparatus for catalytic cracking, the objective is to generate a narrow distribution of droplet size of hydrocarbon feed with sauter mean diameter (SMD) nearly equal to the average particle size of the catalyst particles. Bigger droplets will cause more penetration into the catalyst bed in riser and form coke and dry gas. Smaller droplet size will cause less penetration.

US20120302805 discloses a feed nozzle assembly comprising at least one primary mixing chamber, a secondary mixing chamber and a tertiary mixing chamber and also a contraction and expansion member. A primary mixture is formed in the primary mixing chamber on introducing a diluent and a hydrocarbon feed. The primary mixture is thereafter introduced into the secondary mixing chamber wherein a first portion of dispersion stream is introduced into said mixture to form a secondary mixture. A second portion of the diluent/dispersion stream is further introduced into the secondary mixture in a tertiary chamber to form a tertiary mixture. The contraction member in said apparatus is used to increase the kinetic energy of the secondary mixture entering into the tertiary chamber.

U.S. Pat. No. 6,902,707 describes a FCC feed injector wherein the atomizing medium is injected at multiple stages to decrease the feed droplet size. The feed injector comprises a plurality of inlets and plurality of mixing zones. The mixing zones are in fluid connection with each other. In one embodiment, the injector comprises an external sparger configured to define a first mixing zone. In another embodiment, the injector comprises a mixing tee configured to define the first mixing zone. The first mixing zone receives the first atomizing fluid and the hydrocarbon feed to form a first mixture. The second mixing zone receives a second atomizing fluid and the mixture from the first mixing zone to form a second mixture. The second mixture is, thereafter, dispensed into the riser reactor zone in a pre-determined spray pattern.

U.S. Pat. No. 6,669,104 B2 discloses a liquid atomization apparatus having an inlet and an outlet. An impingement mixing zone and a shear mixing zone are located between the inlet and the outlet. The fluid introduced into the inlet is initially divided into two separate streams which are then passed into and through an impingement mixing zone in which they are mixed to form a single stream. The mixed, single stream is then passed into and through a shear mixing zone and then into a lower pressure expansion zone, in which atomization occurs to form a spray of atomized drops of the liquid.

CN202290379U discloses an apparatus comprising a primary steam pipe arranged in an outer sleeve. The said primary steam pipe comprises a primary steam spray hole I at the end socket and a primary steam spray hole II at the front end of the primary steam pipe. The apparatus further comprises an inner sleeve and a raw oil inlet pipe tangential with the outer sleeve. The apparatus further comprises a contraction segment, a throat segment and an expansion segment. As secondary steam chamber is formed between the inner sleeve and the outer sleeve. A secondary steam spray hole is arranged at the end socket of the secondary steam chamber and a nozzle orifice is also provided.

CN 201372270 discloses heavy oil feed nozzle comprising an outer sleeve and an inner sleeve concentric to each other. The said nozzle comprises injection of hydrocarbon feed and the steam at multiple stages. The said nozzle comprises a contraction and expansion member. The said nozzle is characterized by multiple numbers of inlets for injection of hydrocarbon steam and diluent/dispersion stream at various stages.

1987/MUM/2015 discloses an apparatus for mixing and atomizing hydrocarbon stream with diluent/dispersion stream. The said apparatus forms a thin film of hydrocarbon and cross shears the same with dispensing diluent/dispersion stream. The said apparatus is used for mixing and atomization of light hydrocarbon feeds. The said apparatus does not comprise expansion and contraction zones.

As can be seen from the prior arts, there has been constant improvements in the apparatuses and methods for mixing and atomizing a hydrocarbon stream using a diluent/dispersion stream. However, there is a further room for improvement in such apparatuses for achieving a desired distribution of droplet size, especially in case of heavy hydrocarbon feeds. It is also required that the construction of such apparatuses is not complicated and is simple and reliable.

SUMMARY OF THE INVENTION

In accordance with the purposes of the invention, the present invention as embodied and broadly described herein, comprises an apparatus and method thereof for mixing and atomizing a hydrocarbon stream using a diluent/dispersion stream.

The apparatus comprises an inner conduit and an outer conduit concentric to each other to define an annular space. The outer conduit includes an inlet for receiving the hydrocarbon stream and an outlet for dispensing a mixture comprising the hydrocarbon and the dispersion/diluent stream. The apparatus further comprises a diluent/dispersion stream distributor being in connection with the inner conduit. The said diluent/dispersion stream distributor comprises a central orifice and a first set of orifices. The first set of orifices is adapted to dispense a first portion of diluent/dispersion stream into the annular space. The central orifice is adapted to dispense a second portion of the diluent/dispersion stream into the inner conduit. The apparatus further comprises at least one contraction and expansion member downstream the first set of orifices. A second set of orifices are located downstream said contraction and expansion member. The said second set of orifices is located on the periphery of the inner conduit and is adapted to dispense the second portion of the diluent/dispersion stream into the annular space.

The method for mixing and atomizing a hydrocarbon stream using a diluent/dispersion stream comprises: providing the apparatus in accordance with the embodiments of the present invention, introducing hydrocarbon stream and introducing diluent/dispersion stream in said apparatus. The apparatus in accordance with the invention comprises an inner conduit and an outer conduit concentric to each other to define an annular space. The outer conduit includes an inlet for receiving the hydrocarbon stream and an outlet for dispensing a mixture comprising the hydrocarbon and the dispersion/diluent stream. The apparatus further comprises a diluent/dispersion stream distributor being in connection with the inner conduit. The said diluent/dispersion stream distributor comprises a central orifice and a first set of orifices. The first set of orifices is adapted to dispense a first portion of diluent/dispersion stream into the annular space. The central orifice is adapted to dispense a second portion of the diluent/dispersion stream into the inner conduit. The apparatus further comprises at least one contraction and expansion member downstream the first set of orifices. A second set of orifices are located downstream said contraction and expansion member. The said second sets of orifices are located on the periphery of the inner conduit and are adapted to dispense the second portion of the diluent/dispersion stream into the annular space.

These and other aspects as well as advantages will be more clearly understood from the following detailed description taken in conjugation with the accompanying drawings and claims.

BRIEF DESCRIPTION OF THE ACCOMPANYING DRAWINGS

To further clarify advantages and aspects of the invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings in accordance with various embodiments of the invention, wherein.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the invention. Furthermore, the one or more elements may have been represented in the drawings by conventional symbols, and the drawings may show only those specific details that are pertinent to understanding the embodiments of the invention so as not to obscure the drawings with details that will be readily apparent to those of ordinary skill in the art having benefit of the description herein.

DETAILED DESCRIPTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Figure 1:
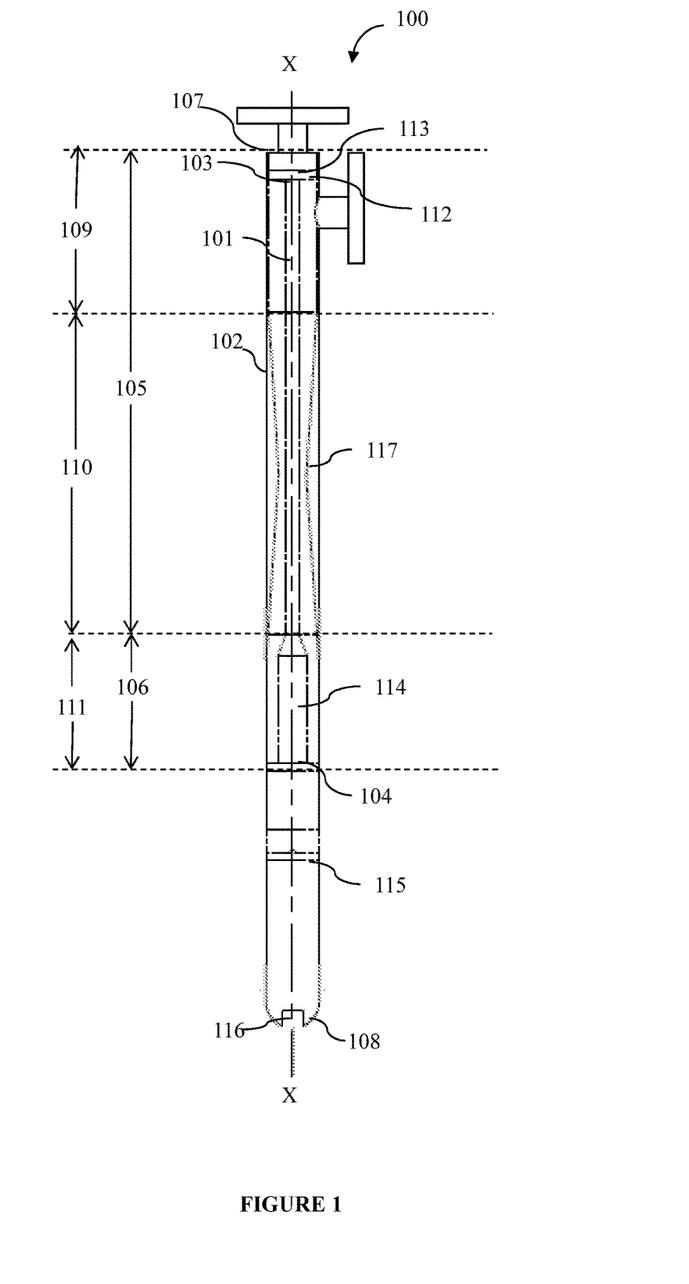
FIG. 1 illustrates a schematic view of an apparatus 100 for mixing the hydrocarbon stream using a diluent/dispersion stream, in accordance with one or more embodiments of the present invention.

FIG. 1 illustrates a schematic view of an apparatus 100 for mixing and hydrocarbon stream using a diluent/dispersion stream, in accordance with one or more embodiments of the present invention.

The apparatus 100 having a central longitudinal axis (X) comprises an inner conduit 101 and an outer conduit 102. The inner conduit 101 includes a first end 103, a second end 104 and a hollow channel extending there between. The inner conduit 101 may be divided into at least an upper portion 105 and a lower portion 106. The lower portion 106 is downstream of said upper portion 105 and has a diameter greater than that of the upper portion 105. The first end 103 of the inner conduit 101 is connected to a diluent/dispersion stream distributor 113 and receives a portion of dispersion/diluent steam via the diluent/dispersion stream distributor 113. The diluent/dispersion stream includes steam, nitrogen, fuel gas and other suitable diluent/dispersion medium known in the art.

The outer conduit 102, like inner conduit 101, defines a first end 107, a second end 108 and a hollow channel extending there between. One or more inlets may be located at about the first end 107 of the outer conduit for introducing the hydrocarbon stream. The hydrocarbon stream includes entire range of liquid petroleum fractions which will include cokernaphta, coker gas oil, vacuum gas oil (VGO), hydro treated vacuum gas oil (VGO), hydrocracker bottom, straight run naphtha, visbreaker naphtha, vaccum residue (VR), vaccum residue (VR) tar, reduced crude oil (RCO) and combination thereof.

The outer conduit 102 surrounds the inner conduit 101 to define an annular space. For the purposes of the present invention, the said annular space may be divided into at least a primary mixing zone 109, a contraction and expansion zone 110 and a secondary mixing zone 111.

The primary mixing zone comprises the diluent/dispersion stream distributor 113 in connection with the inner conduit 101. The diluent/dispersion stream distributor 113 may be a perforated plate comprising a central orifice and a first set of orifices. The first set of orifices may be patterned around the central orifice as shown in the FIG. 2. The central orifice is in connection with the inner conduit. The diluent/dispersion stream distributor 113 receives steam from one or more steam sources. The first set of orifices direct the first portion of diluent/dispersion stream into the annular space between the inner conduit 101 and the outer conduit 102. The central orifice directs a second portion of the diluent/dispersion stream into the inner conduit 101. The first portion of the diluent/dispersion stream dispensed by the first set of orifices is in the range of 50-95% of the total diluent/dispersion stream received by the diluent/dispersion stream distributor 113. The first portion of diluent/dispersion steam is dispensed in a direction substantially parallel to the longitudinal axis (X) of the apparatus.

The contraction and expansion zone 110 comprises at least one contraction and expansion member 117. The contraction member is located downstream the first set of orifices and the expansion member is located downstream said contraction member. The said at least one contraction and expansion member 117 may be located on one or more: (i) the inner surface of the outer conduit, and (ii) the outer surface of the inner conduit. For the purposes of this invention, the length to diameter ratio of said contraction and expansion member is at least 3.

The secondary mixing zone 111 comprises a second set of orifices 114 adapted for dispensing a second portion of the diluent/dispersion stream in the annular space between the inner conduit 101 and the outer conduit 102. The second sets of orifices 111 are located on the lower portion 106 of the inner conduit 101 along the length of the inner conduit. The said second set of orifices 111 is located on the periphery/circumference of the inner conduit 101. The second set of orifices dispenses the second portion of the diluent/dispersion stream at one or more angle α wherein the angle α is in the range 30≤α≤120.

The said apparatus 100 may further comprise a flow diverter 115, said flow diverter 115 adapted for dividing the mixture comprising the hydrocarbon and the dispersion/diluent streams into a plurality of streams. The said flow diverter 115 is located downstream of the inner conduit 101. The said apparatus 100 further comprises an exit orifice 116 located at the second end 108 of the outer conduit 102 for dispensing the mixture comprising the hydrocarbon stream and diluent/dispersion stream.

During operation, the diluent/dispersion stream and the hydrocarbon stream is pre-heated and introduced into the apparatus 100 via one or more inlets. In one example, the temperature of the diluent/dispersion stream is in the range of 150 degrees celsius to 350 degrees celsius and the temperature of the hydrocarbon stream is in the range of 150 degrees celsius to 400 degree celsius.

The dispersion/diluent stream is introduced into the apparatus and received by the diluent/dispersion stream distributor. The first portion of the dispersion/diluent stream is dispensed in the primary mixing zone by means of the first of orifices and the second portion of the diluent/dispersion stream is introduced into the inlet conduit by means of the central orifice. The first portion of the diluent/dispersion stream is introduced into the primary mixing zone in a direction substantially parallel to the longitudinal axis (X) of the apparatus. The first portion of the diluent/dispersion stream mixes with the hydrocarbon stream to form a first mixture. The said first mixture comprises hydrocarbon feed mostly in the form of ligament or string like structure.

The first mixture formed in the first mixing zone, thereafter, moves into the contraction and expansion zone 110 wherein it passes through at least one contraction and expansion members 117. The contraction member and expansion member are in the form of tapered sections that continuously decrease the cross-section of flow path and then increase the cross-section of flow path to the full diameter of the apparatus. The contraction and expansion zone of the present invention is almost twice the length of the primary mixing zone or the secondary mixing zone. The contraction and expansion member of the present invention is at least half the length of the inner conduit. Without wishing to be limited to any hypothesis, aspects such as (a) providing the contraction and expansion zone between the first and the second mixing zones, (b) the contracting zone being formed of tapered section that continuously decreases the cross-section of flow path, (c) the expansion zone being formed of tapered section that continuously increases the cross-section of flow path, (d) the length of the contraction and expansion zone being almost twice the length of the primary mixing zone or the secondary mixing zone provides for improved performance. In particular, the hydrocarbon feed in ligament or string form in the first mixture breaks into smaller droplets during its passage through the contraction and expansion member without the injection of additional diluent/dispersion stream in the expansion and contraction zone. The gradually decreasing flow area in the contraction zone provides a smooth profile and avoids turbulence. Gradually increasing flow area in the expansion zone is believed to most effectively control the acceleration of the first mixture. Also, minimum pressure losses are experienced by the first mixture.

It is known that apparatuses for mixing hydrocarbon stream with diluent/dispersion stream such as feed injectors are designed to have a low pressure drop. The pressure drop across the tip of such apparatus is significantly higher, so it is highly recommended to avoid any other means/zones inside the body of the apparatus which will contribute higher pressure drop. In case of sudden contraction and expansion, the pressure drop across the body of the apparatus will be higher. Accordingly, sudden contraction and expansion imparting higher pressure drop are not recommended. On the contrary, in case of slow contraction, the pressure drop will be gradual and will recover gradually in the expansion section. In view thereof, the present invention provides at least one contraction and expansion member wherein the length of the contraction and expansion member is almost half the length of the inner conduit or twice the length of the primary mixing zone or the secondary mixing zone to facilitate slow and steady contraction and expansion of the first mixture. Slow contraction leads to gradual increase in velocity and decrease of pressure. Similarly, slow expansion leads to gradual recovery of pressure and velocity with minor losses. This gradual change of pressure and velocity in the contraction and expansion zone leads to breakup of ligament structure of hydrocarbon stream into smaller ligaments or droplets without a higher pressure drop inside the body of the apparatus.

It is also crucial to note that, in most of the prior arts, it is found that the contraction and expansion members are located at about the final length of the apparatus. However, the contraction and expansion member in the design of the present invention is placed just after the first mixing zone, to facilitate the breakage of hydrocarbon in the first mixture when it will pass though the contraction and expansion zone. This break up of hydrocarbons in the first mixture is without the addition of diluent/dispersion stream. Thereafter a second portion of diluent/dispersion stream is provided downstream of contraction and expansion zone to further enhance the mixing and breakup of hydrocarbon stream. The secondary diluent/dispersion stream is thereby mixed with the first mixture coming from the contraction and expansion zone to further breaks any leftover bigger ligaments of hydrocarbon. It is also to be noted that in case the contraction and expansion zone is placed just before the exit orifice, there shall be no need of the dispersion/diluent stream distributor as well as the secondary mixing zone. Also, the exit orifice/injector tip acts as sudden contraction and expansion zone which leads to final breakup of droplets. If the contraction and expansion members are placed just before the exit orifice/injector tip, there will be two contraction expansion zones subsequently which will not provide any significant advantage to the break up off the hydrocarbon stream. The present invention, therefore, strategically places the contraction and expansion members after the first mixing zone. It is also to be noted that, in the design of the present invention, only one diluent/dispersion stream inlet is used to facilitate passage of diluent/dispersion stream for primary as well as secondary zone which greatly simplifies the design of the present invention.

The first mixture, after exiting the contraction and expansion zone, passes into a secondary mixing zone 111. The secondary mixing zone 111 comprises a second set of orifices 114. The second set of orifices 114 is distributed on the periphery of the lower portion 106 of the inner conduit 101. The second portion of the diluent/dispersion stream is dispensed by second set of orifices 114 into the first mixture to form a second mixture. As already stated, the second set of orifices dispense the second portion of the diluent/dispersion stream at one or more angle α wherein the angle α is in the range 30≤α≤120. The dispensing of second portion of the diluent/dispersion stream into the first mixture further reduces the droplet size of the hydrocarbon feed. Thus, in all the three zones, the size of the hydrocarbon feed droplets is progressively reduced.

The method may also comprise breaking the second mixture comprising the hydrocarbon and diluent/dispersion stream into a plurality of streams by means of a flow diverter 115 located downstream of the inner conduit 101 and upstream of the exit orifice 116. The flow diverter 116 breaks the second mixture by creating turbulence, providing high velocity and avoiding any coalescence of the drops. The flow diverter 116 divides the flow area into a plurality of quadrants with the help of plurality of triangular diverters which meet at the longitudinal axis of the apparatus. At the meeting point, a small circular cone with its vertex towards the upstream direction is provided so as to facilitate and provide easy passage of the second mixture comprising the hydrocarbon stream and the diluent/dispersion stream.

The second mixture/plurality of streams comprising the hydrocarbon feed and the diluent/dispersion stream is received in at least one exit orifice 116 located at the outlet end of the outer conduit. An emergence of the mixture out of the exit orifice 116 at a very high velocity individually atomizes the mixture. Specifically, the high velocity of the outgoing mixture contributes to formation of smaller size droplets of the liquid hydrocarbon feed present within the mixture.

It is to be understood that the diluent/dispersion stream can be divided into plurality of portions and can be introduced into the mixture at different stages. Each time a portion of the diluent/dispersion stream is introduced into the mixture, the viscosity of the mixture is progressively reduced.

Figure 2:
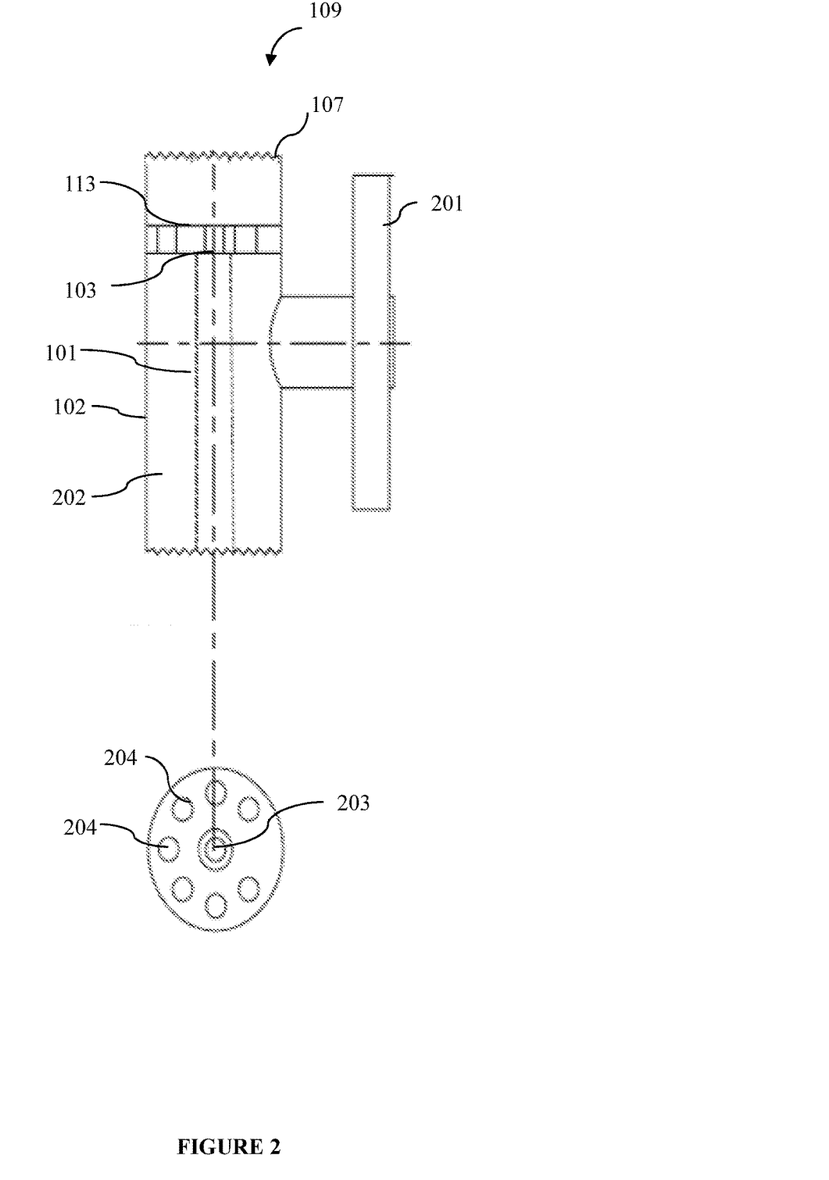
FIG. 2 illustrates an enlarged view of the initial length 109 of the apparatus 100, in accordance with the embodiments of the present invention.

FIG. 2 illustrates an enlarged view of the initial length 109 of the apparatus 100, in accordance with the embodiments of the present invention.

As shown in FIG. 2, the apparatus comprises an inlet 201 for introduction of the hydrocarbon stream. The hydrocarbon is introduced into the annular space 202 between the inner conduit 101 and the outer conduit 102. Although a single inlet 201 has been shown for introduction of hydrocarbon stream into said annular space, it is to be understood that plurality of inlets may be located at the first end 107 of the outer conduit 102 for introduction of hydrocarbon stream. In one example, two inlets may be spaced apart at an angle of 180 degrees. In another example, three inlets may be spaced apart at an angle of 120 degrees. In yet another example, four inlets may be spaced apart at an angle of 90 degrees. It is to be understood that there may be many such combination of inlets for introduction of hydrocarbon stream into the apparatus.

The apparatus 100 further comprises a diluent/dispersion stream distributor 113 in connection with the inner conduit 101. The said diluent/dispersion stream distributor 113 comprises a central orifice 203 and a first set of orifices 204. The central orifice 203 is in connection with the first end 103 of the inner conduit 101. The diluent/dispersion stream distributor 113 receives the diluent/dispersion stream from one or more inlets (not shown) and dispenses first portion of the dispersion/diluent stream into the primary mixing zone via the first set of orifices 204. The second portion of the dispersion/diluent stream is directed into the inner conduit 101. The first portion of the diluent/dispersion stream is dispensed in a direction substantially parallel to the longitudinal axis X of the apparatus.

Figure 3:
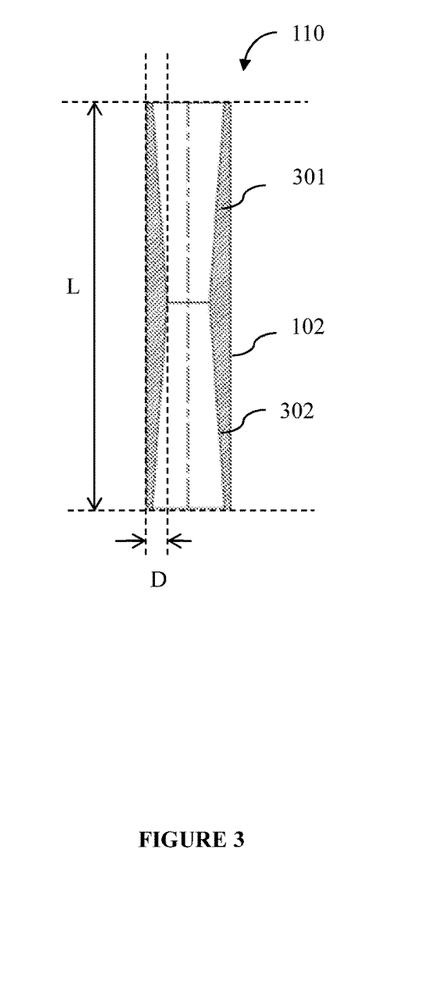
FIG. 3 illustrates an enlarged view of the contraction and expansion zone 110 of the apparatus 100, in accordance with the embodiments of the present invention.

FIG. 3 illustrates an enlarged view of the contraction and expansion zone 110 of the apparatus 100, in accordance with the embodiments of the present invention.

As shown in FIG. 3, the contraction and expansion zone 110 comprises at least one contraction 301 and one expansion member 302 located on the inner surface of the outer conduit 102. The expansion member 302 is located downstream the contraction member 301. Each contraction 301 and expansion member 302 has a length (L) to diameter (D) ratio of at least 3. The said contraction 301 and expansion 302 members may be located on one or more: (i) inner surface of the outer conduit; and (ii) outer surface of the inner conduit. It is to be understood that the contraction and expansion zone may comprise a plurality of contraction and expansion members.

Figure 4:
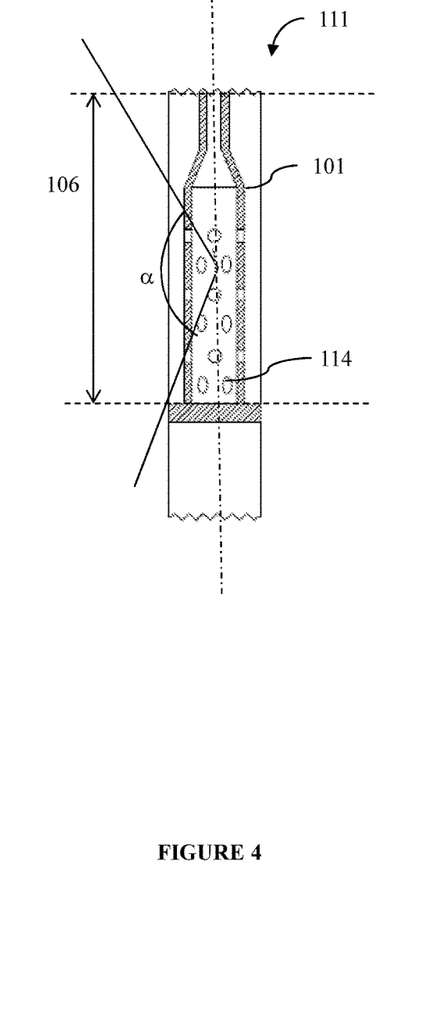
FIG. 4 illustrates an enlarged view of the secondary mixing zone 111 of the apparatus 100, in accordance with the embodiments of the present invention.

FIG. 4 illustrates an enlarged view of the secondary mixing zone 111, of the apparatus, in accordance with the embodiments of the present invention.

As illustrated, the secondary mixing zone 111 comprises a second set of orifices 114 located on the lower portion 106 of the inner conduit 101. The said second set of orifices 114 is located on the periphery of the inner conduit 101. In one example, the inner conduit 101 comprises two orifices located opposite to each other on the periphery thereof. In another example, the inner conduit 101 comprises a plurality of orifices distributed along length of the lower portion 106 of the inner conduit. The second set of orifices 114 is designed to dispense the second portion of the diluent/dispersion stream into the first mixture flowing from the contraction and expansion zone at high velocity and at one or more pre-determined angle α wherein angle α is in the angle in the range of $30 \leq \alpha \leq 120$.

Figure 5:
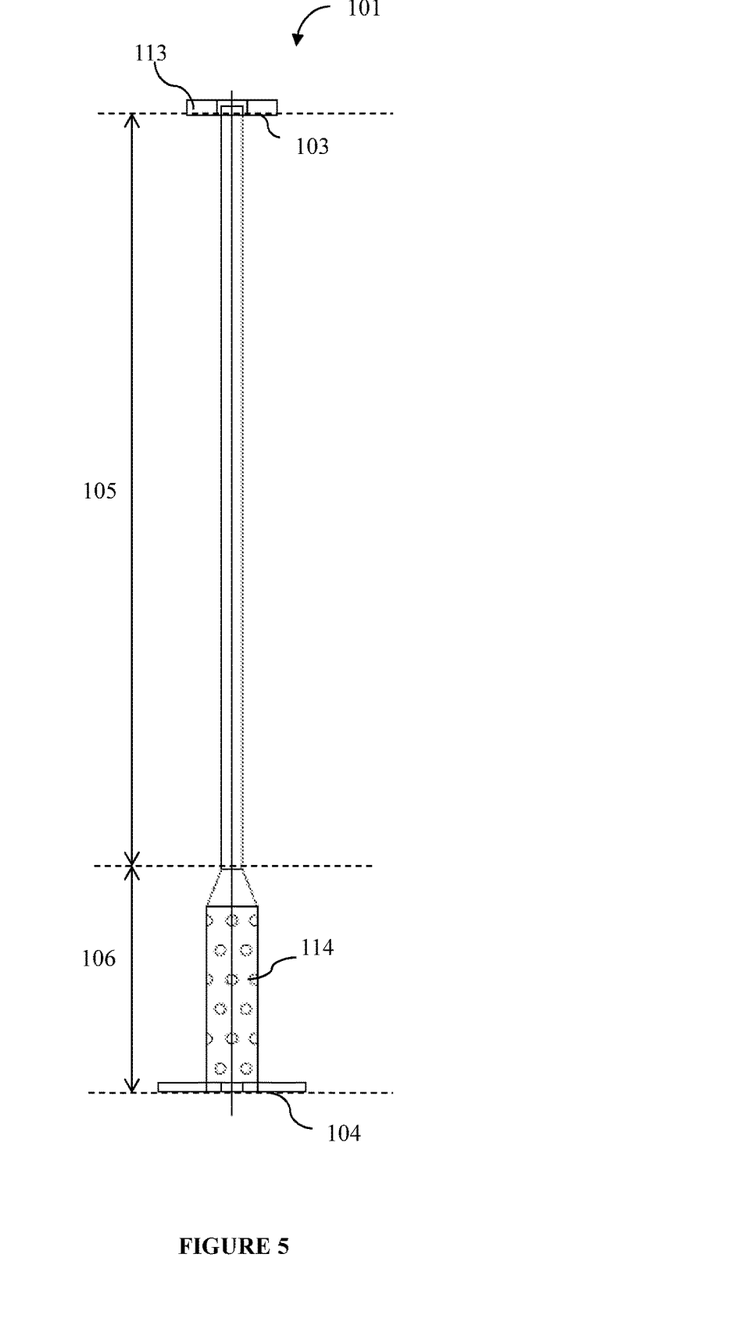
FIG. 5 illustrates a schematic view of the inner conduit 101 of the apparatus 100, in accordance with the embodiments of the present invention.

FIG. 5 illustrates a schematic view of the inner conduit 101 of the apparatus 100, in accordance with the embodiments of the present invention.

As shown in the FIG. 5, the diameter of the lower portion 106 of the inner conduit 101 is greater than the diameter of the upper portion 105 of inner conduit. The lower portion 106 of the inner conduit 101 is located at the secondary mixing zone. The diameter of the lower portion 106 is greater than that of the upper portion 105 to vary the flow characteristics of the second portion of the diluent/dispersion stream in the lower portion 502. The lower portion 106 of the inner conduit 101 comprises a second set of orifices 114 along the periphery thereof. The first end 103 of the inner conduit is connected to a diluent/dispersion stream distributor 113. The second end 104 of the inner conduit may be closed or in some cases may be connected to one or more sparging means.

FIGS. 6(a), 6(b) and 6(c) illustrates various enlarged views of the flow diverter 115 in accordance with the embodiments of the present invention.

The flow diverter 115 divides the mixture comprising the hydrocarbon and the dispersion/diluent streams into a plurality of streams. As can be seen in FIG. 6(a), the top view of the flow diverter 115 illustrates a plurality of triangular diverters 601. The said pluralities of diverters 601 are adapted to meet at a point to form a circular cone 602 with its vertex in an upstream direction. The said flow diverter 115 is placed downstream the inner conduit. In case, the apparatus also comprises the sparging means, said flow diverter is located downstream said sparging means.

Figure 6:
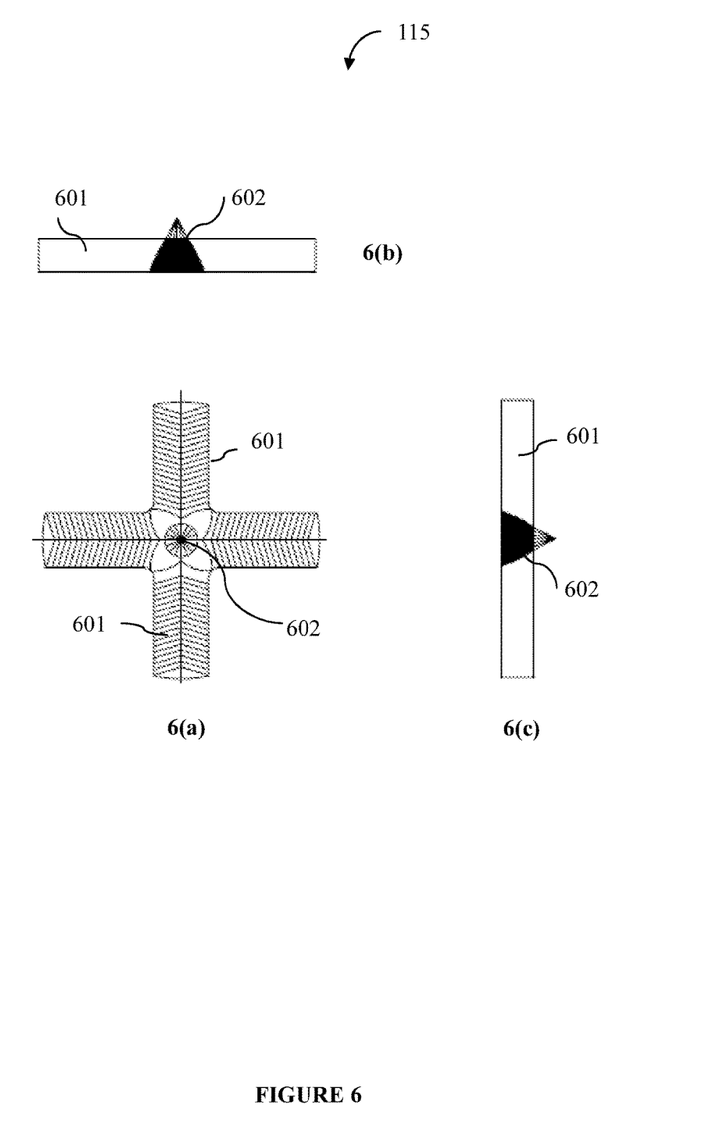
FIGS. 6(a), 6(b) and 6(c) illustrates various enlarged views of the flow diverter 115 of the apparatus 100, in accordance with the embodiments of the present invention.

The flow diverter 115 is adapted to further break the mixture comprising the hydrocarbon stream and the diluent stream by creating turbulence, providing high velocity and avoiding any coalescence of droplets of the mixture comprising the hydrocarbon stream and the diluent/dispersion stream. The flow diverter 115 illustrated in FIG. 6 divides the flow area into four quadrants with the help of four triangular diverters 601. The flow diverters 601 meet at a point to form a circular cone 602 with its vertex in an upstream direction. FIGS. 6(*b*) and 6(*c*) are side views of the flow diverter 600 illustrating the circular cone 602. The said circular cone 602 is adapted to facilitate and provide easy passage to the mixture comprising the hydrocarbon stream and the diluent/dispersion stream.

Figures 7A, 7B:
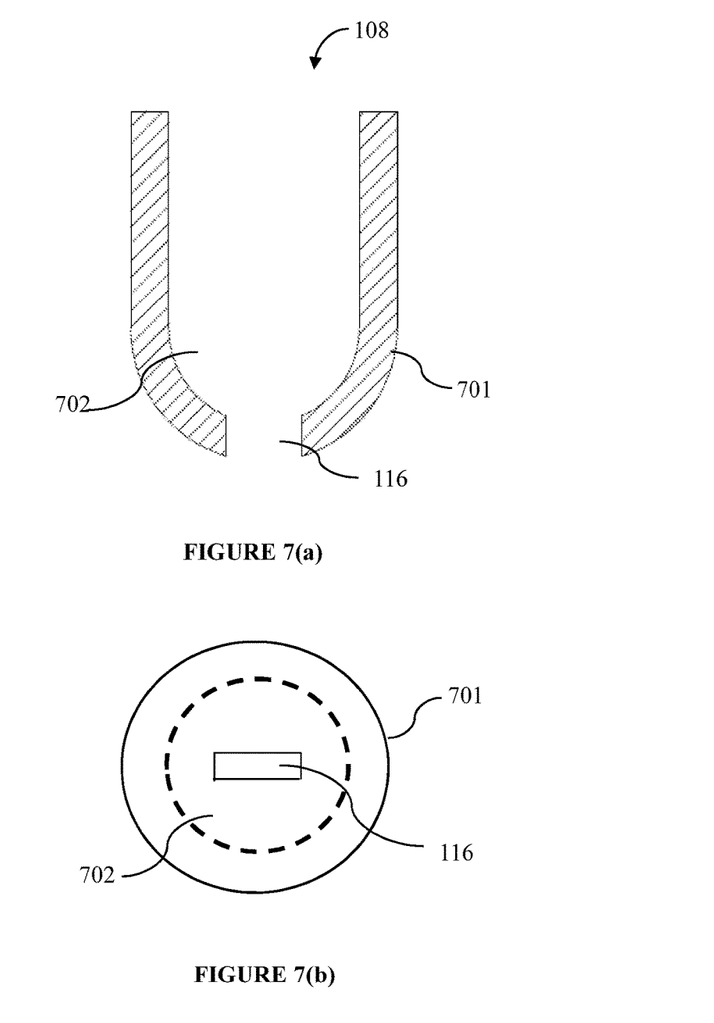
FIG. 7a illustrates a schematic view of the outlet end 108 of the outer conduit 102, thereby depicting the tip region of the apparatus 100.
FIG. 7b illustrates a bottom view of the outlet end 108 of the outer conduit 102, thereby depicting a bottom view of tip region of the apparatus.

FIG. 7*a* illustrates a schematic view of the outlet end 108 of the outer conduit 102, thereby depicting the tip region of the apparatus 100. FIG. 7*b* illustrates a bottom view of the outlet end 108 of the outer conduit 102, thereby depicting a bottom view of tip region of the apparatus.

As depicted by FIGS. 7*a* and 7*b*, the apparatus has an orifice 116 disposed at the boundary 701 of the tip region 702. Specifically, the orifice 116 is an opening provided on the boundary 701 in the shape of a slot, as depicted by FIG. 7*b*. In operation, the orifice 116 receives mixture comprising the hydrocarbon and diluent/dispersion stream. An emergence of the mixture out of the orifice 116 at a very high velocity individually atomizes the mixture. Specifically, the high velocity of the outgoing mixture contributes to formation of smaller size droplets of the liquid hydrocarbon feed present within the mixture. The orifice 116 acts as a gateway to lead the atomized mixture out of the apparatus. As mentioned before, the orifice 116 is in the form of the slot. In one example, the orifice 116 may be in the form a cylindrical notch. By virtue of the aforementioned geometrical design of the orifice 116, the outgoing and individually atomized mixture streams from the orifice 116 reinforce in one another to produce the flat fan shaped spray. The spray includes of a finely atomized droplets of the liquid hydrocarbon feed. In addition, the angle of the flat fan spray so produced depends upon a slot angle of the orifice 116. In one implementation, the slot angle of the orifice 700 is such that a flat fan spray having the spray angle between 60 degrees to 120 degrees is produced. This range of angle may be sufficient for the flat fan spray to cover the entire cross-section of a riser reactor. The spray so produced has all hydrocarbons feed droplets of identical diameter and uniformly distributed throughout the spray cross-section. In one implementation, a sauter mean diameter of the droplet within the atomized liquid hydrocarbon feed is achieved as 95-120 μm. In one example, there may be more than one orifice 116 that may be disposed at various elevations within the tip region 702. These multiple orifices 116 may be disposed at different elevations within the tip region 702 of the apparatus to produce a number of flat fan sprays. In such case, the orifices 116 may be disposed within the tip region 702 at various angles to one another for converging the multiple flat fan sprays on a single plane with or without overlapping to produce more uniformity in the droplet size and the droplet velocity distribution on the single plane. In one example, the apparatus of the present invention may be placed within the riser reactor at angle between 60 degrees and 90 degrees to the horizontal.

While certain present preferred embodiments of the invention have been illustrated and described herein, it is to be understood that the invention is not limited thereto. Clearly, the invention may be otherwise variously embodied, and practiced within the scope of the following claims.

We claim:

1. An apparatus for mixing and atomizing a hydrocarbon stream using a diluent/dispersion stream, said apparatus comprising:

an inner conduit and an outer conduit concentric to each other to define an annular space, said outer conduit having an inlet for receiving the hydrocarbon stream and an outlet for dispensing a mixture comprising the hydrocarbon and the dispersion/diluent streams;

a diluent/dispersion stream distributor being in connection with the inner conduit and defining a central orifice and a first set of orifices, said first set of orifices adapted to direct a first portion of the dispersion/diluent stream into the annular space and said central orifice adapted to direct a second portion of the diluent/dispersion stream into the inner conduit;

at least one contraction member in the form of tapered section and at least one expansion member in the form of tapered section, said contraction member located downstream of the first set of orifices and said expansion member located downstream said contraction member;

the inner conduit located downstream of said expansion member comprises a second set of orifices, said second set of orifices disposed on a periphery of the inner conduit and adapted to dispense a second portion of the dispersion/diluent stream into the annular space; and a flow diverter located downstream to the inner conduit, said flow diverter adapted for dividing the mixture comprising the hydrocarbon and the dispersion/diluent streams into a plurality of streams; and wherein the flow diverter comprises a plurality of triangular diverters, said plurality of triangular diverters adapted to meet at a point on a longitudinal axis of the apparatus to form a circular cone with its vertex in an upstream direction.

2. The apparatus as claimed in claim 1, wherein the first set of orifices direct the first portion of the dispersion/diluent stream in a direction substantially parallel to a longitudinal axis of the apparatus.

3. The apparatus as claimed in claim 1, wherein the second set of orifices direct the second portion of the dispersion/diluent stream at an angle in the range of 30 to 120 degrees with respect to a longitudinal axis of the apparatus.

4. The apparatus as claimed in claim 1, wherein combined length of the at least one contraction and at least one expansion member is at least half of a length of the inner conduit.

5. The apparatus as claimed in claim 1, wherein said at least one contraction member and said at least one expansion member is located on one or more:

inner surface of the outer conduit; and outer surface of the inner conduit.

6. The apparatus as claimed in claim 1, wherein each of the contraction member and each of the expansion member has a length to average diameter ratio of at least 3.

7. The apparatus as claimed in claim 1, wherein the inner conduit includes an upper portion and a lower portion, said lower portion being downstream of said upper portion and having a diameter greater than that of the upper portion.

8. The apparatus as claimed in claim 7, wherein the lower portion of the inner conduit comprises the second set of orifices.

9. A method for mixing and atomizing a hydrocarbon stream using a diluent/dispersion stream, said method comprising:

providing an apparatus comprising:

an inner conduit and an outer conduit concentric to each other to define an annular space, said outer conduit having an inlet for receiving the hydrocarbon stream and an outlet for dispensing a mixture comprising the hydrocarbon and the dispersion/diluent streams;

a diluent/dispersion stream distributor being in connection with the inner conduit and defining a central orifice and a first set of orifices, said first set of orifices adapted to direct a first portion of the dispersion/diluent stream into the annular space and said central orifice adapted to direct a second portion of the diluent/dispersion stream into the inner conduit;

at least one contraction member in the form of tapered section located downstream of the first set of orifices;

at least one expansion member in the form of tapered section located downstream of said contraction member;

the inner conduit located downstream of said expansion member comprises a second set of orifices, said second set of orifices disposed on a periphery of the inner conduit and adapted to dispense a second portion of the dispersion/diluent stream into the annular space; and a flow diverter located downstream to the inner conduit, said flow diverter adapted for dividing the mixture comprising the hydrocarbon and the dispersion/diluent streams into a plurality of streams; wherein the flow diverter comprises a plurality of triangular diverters, said plurality of triangular diverters adapted to meet at a point on a longitudinal axis of the apparatus to form a circular cone with its vertex in an upstream direction;

introducing the diluent/dispersion stream into the inlet of the inner conduit; and introducing the hydrocarbon stream into the inlet of the outer conduit.

10. The method as claimed in claim 9, wherein the first portion of the diluent/dispersion stream is 50-95 percent of the diluent/dispersion stream.

* * * * *